United States Patent
Grosberg et al.

(10) Patent No.: US 6,747,999 B1
(45) Date of Patent: Jun. 8, 2004

(54) JITTER BUFFER ADJUSTMENT ALGORITHM

(75) Inventors: Mark Grosberg, Boca Raton, FL (US); Mark Flanagan, Boynton Beach, FL (US); Kristin Butcher, Boynton Beach, FL (US); Jeff Cripe, Lake Worth, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/440,215

(22) Filed: Nov. 15, 1999

(51) Int. Cl.[7] .................................................. H04J 3/06
(52) U.S. Cl. ........................................ 370/516; 370/235
(58) Field of Search ................................ 370/368, 378, 370/516–517, 428, 429, 238, 237, 252, 235

(56) References Cited

U.S. PATENT DOCUMENTS

| | | | |
|---|---|---|---|
| 4,147,895 A | 4/1979 | Fenoglio | 179/15 |
| 5,146,477 A | 9/1992 | Cantoni et al. | 375/112 |
| 5,423,020 A | 6/1995 | Vojnovich | 395/425 |
| 5,528,598 A | 6/1996 | Ng | 370/102 |
| 5,534,937 A | 7/1996 | Zhu et al. | 348/466 |
| 5,550,877 A | 8/1996 | Waters | 375/372 |
| 5,621,775 A | 4/1997 | Etienne | 375/372 |
| 5,640,388 A | 6/1997 | Woodhead et al. | 370/468 |
| 5,652,627 A | 7/1997 | Allen | 348/497 |
| 5,757,871 A | 5/1998 | Furukawa et al. | 375/372 |
| 5,764,298 A | 6/1998 | Morrison | 348/500 |
| 5,778,218 A | 7/1998 | Gulick | 395/558 |
| 5,872,789 A | 2/1999 | Orleth et al. | 370/517 |
| 5,872,823 A | 2/1999 | Sutton | 375/372 |
| 5,881,245 A | 3/1999 | Thompson | 395/200.49 |
| 5,940,479 A | 8/1999 | Guy et al. | 379/93.01 |
| 6,097,698 A | 8/2000 | Yang et al. | 370/231 |
| 6,167,465 A | 12/2000 | Parvin et al. | 710/22 |
| 6,301,251 B1 | 10/2001 | Kim et al. | 370/395 |
| 6,377,931 B1 | 4/2002 | Shlomot | 704/503 |
| 6,452,950 B1 * | 9/2002 | Ohlsson et al. | 370/516 |
| 6,473,432 B1 | 10/2002 | Nishimura et al. | 370/412 |

OTHER PUBLICATIONS

Patent application, "Apparatus and Method for Adaptive Jitter Buffer Depletion", filed Oct. 5, 1999, Ser. No. 09/412,876, Atty Dkt No. 99P7889.

* cited by examiner

*Primary Examiner*—Wellington Chin
*Assistant Examiner*—Brenda Pham

(57) ABSTRACT

A jitter buffer controller (110) allows the depth of the jitter buffer (113) to be adjusted dynamically according to the varying jitter of the current sequence. The jitter buffer controller (110) maintains a cache (109) of previous jitter values. This cache contains exponentially averaged values that represent the long-term behavior of specific destination's jitter characteristics, i.e., a jitter characteristic memory. These values are used to initialize the jitter buffer's depth. The jitter cache prevents the buffer's depth from being initialized with an arbitrary value that disregards the specific destination's jitter characteristics.

16 Claims, 2 Drawing Sheets

JITTER BUFFER ADJUSTMENT ALGORITHM

CROSS REFERENCE TO RELATED APPLICATIONS

This application is related to application Ser. No. 09/440,456, titled "Apparatus and Method for Adaptive Jitter Buffers", filed concurrently herewith, and incorporated by reference in its entirety as if fully set forth herein.

BACKGROUND OF THE INVENTION

1. Field of the Invention

The present invention relates to packet transmission and, particularly, to a system and method for optimizing a jitter buffer.

2. Description of the Related Art

When sending voice data across packet networks, such as telephony over LAN (ToL) or Voice over IP (VoIP) networks, the voice is usually compressed, packetized and, finally, sent across the network to the destination. When the packets are sent into the network, they are generated at a constant rate. However, due to behavior of the packet network, the even time intervals between the packets are lost as the packets transit the network. This irregularity in packet separation is referred to as "jitter." Jitter can cause clicks, delays and other annoyances in multimedia transmission, creating overall poor reproduction quality.

A jitter buffer is often used to even out the packet separation. A jitter buffer is a FIFO (first in, first out) buffer in which packets leave the buffer at a predetermined, constant rate. Minimizing the amount of actual jitter buffering is important because the jitter buffering process introduces delays in the reproduced signal. Excessive buffering delays transmission output, while under-buffering causes gaps in the data.

Jitter rates vary throughout a transmission sequence. A jitter rate is the average variance in packet arrival times. It is measured as packets arrive over a specific implementation defined interval. The actual jitter rate reported (in accordance with IETF RFC 1889) is an exponentially averaged value of the jitter for each packet over the interval. The distribution of the averaged jitter rate is significantly different from the actual jitter values, so common queueing theory solutions are not applicable.

A Jitter Buffer designed with a constant predetermined depth is referred to as a Static Jitter Buffer. A Static Jitter Buffer does not recognize each sequence's unique jitter characteristics and can not adjust itself to meet the needs of individual sequences. The inflexibility of the Static Jitter Buffer degrades the smoothing capability of the jitter buffering process, thereby failing to provide sufficient buffering for some sequences while unnecessarily delaying others.

SUMMARY OF THE INVENTION

These and other drawbacks in the prior art are overcome in large part by a system and method according to the present invention. A jitter buffer controller according to the present invention allows the depth of the jitter buffer to be adjusted dynamically according to the varying jitter of the current sequence. The jitter buffer controller maintains a cache of previous jitter values. This cache contains exponentially averaged values that represent the long-term behavior of specific destination's jitter characteristics, i.e., a jitter characteristic memory. These values are used to initialize the jitter buffer's depth. The jitter cache prevents the buffer's depth from being initialized with an arbitrary value that disregards the specific destination's past jitter characteristics.

The jitter buffer controller uses two main variables to adjust the depth of the jitter buffer: current_depth and rise. The current_depth accounts for the current jitter while the rise "cushions" increases to the depth as a result of having a history of past jitter. These two variables are used to create a more accurate depth that is adaptive to varying jitter rates. The jitter buffer depth can change throughout a single data sequence based on the variance of the effective jitter.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
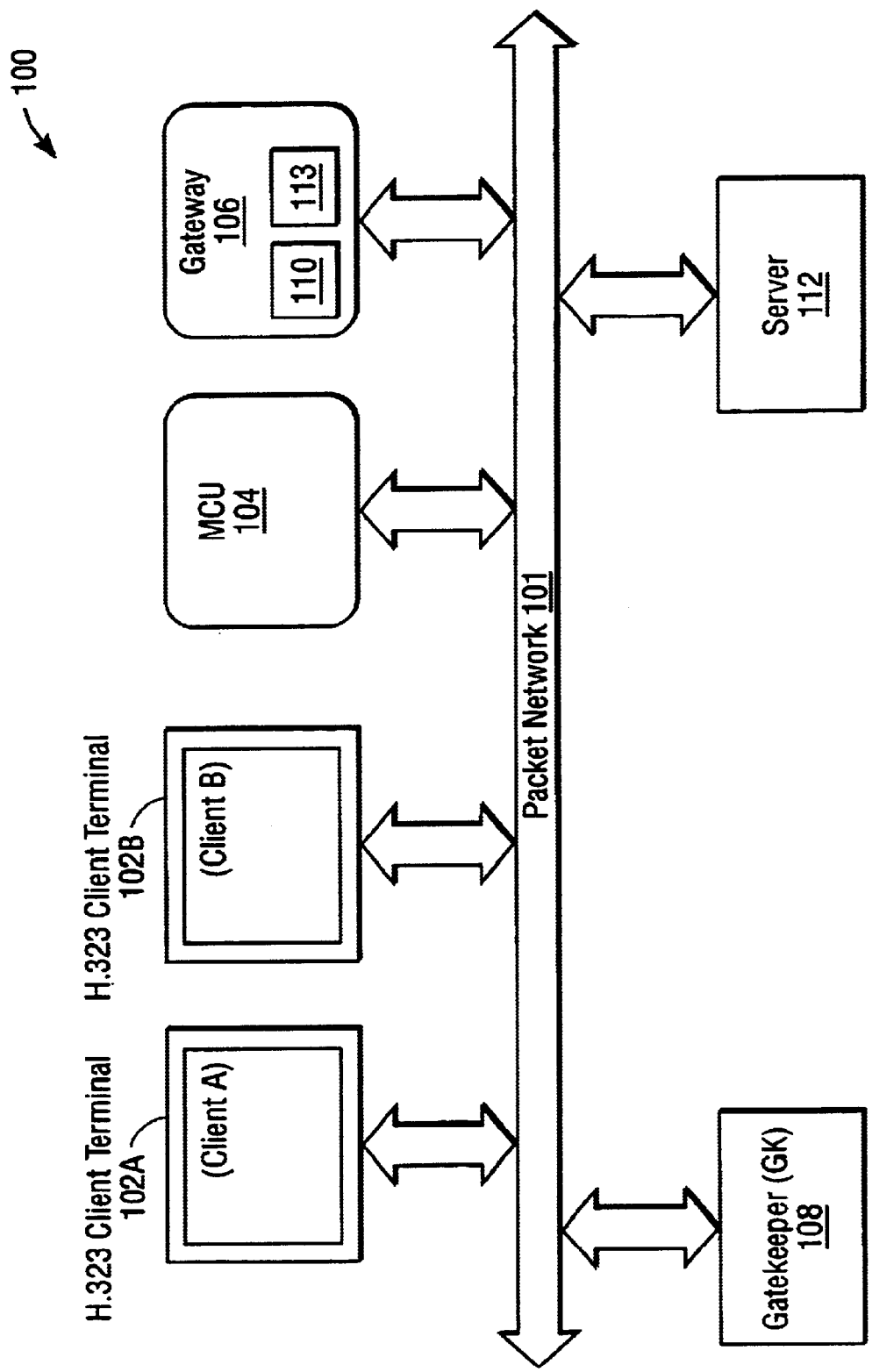
FIG. 1 is a block diagram of an exemplary telephony over LAN (ToL) network according to an embodiment of the invention.
Figure 2:
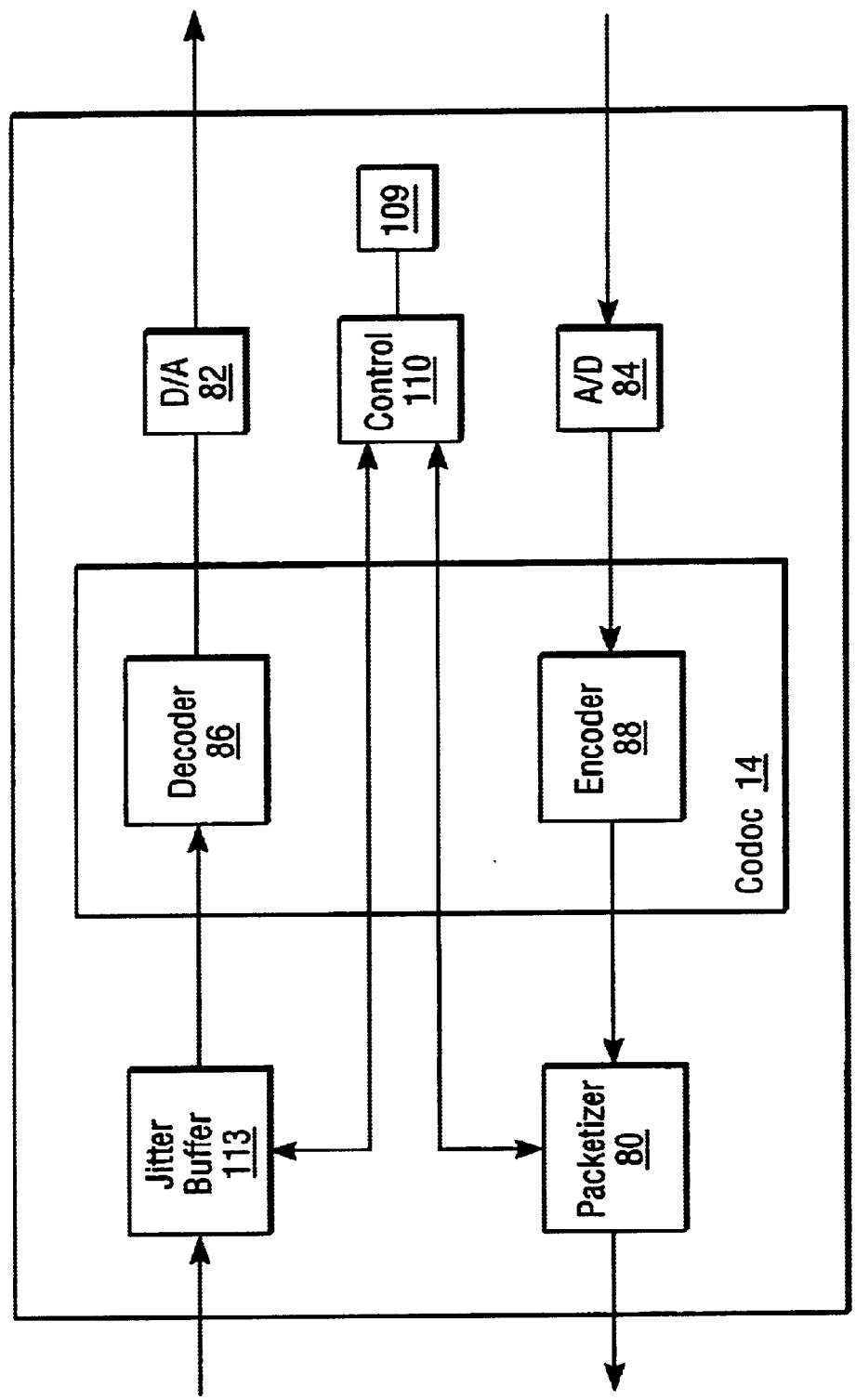
FIG. 2 is a block diagram of an exemplary codec according to an embodiment of the present invention.

FIGS. 1–2 illustrate a system and method for adjusting jitter buffers according to an implementation of the present invention. According to an embodiment of the invention, the depth of a jitter buffer is adjusted based on current jitter and a history of past jitter. It is noted that the teachings of the present invention are applicable to any transmission medium in which data is produced at a constant rate but where the transmission medium perturbs the rate. Thus, the figures are exemplary only.

Turning now to FIG. 1, an exemplary telecommunications system 100 according to an embodiment of the invention is shown therein. The telecommunications system 100 includes a local area network (LAN) or packet network 101. As shown, the telecommunications network is embodied as an H.323 compliant network. It is noted, however, that any type of multimedia packet network or any network for transmission of time dependent data may be employed. As shown, coupled to the LAN 101 are a variety of H.323 terminals 102a, 102b, a multi-point control unit (MCU) 104, an H.323 gateway 106, an H.323 gatekeeper 108, a LAN server 112, and a plurality of other devices such as personal computers (not shown).

The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, as will be explained in greater detail below, one or more of the network entities such as the gateway 106 may include a jitter buffer 113 and jitter buffer control 110 according to the present invention. As will be described in greater detail below, the jitter buffer control 110 functions to identify current and past jitter behavior. Jitter buffer depth is adjusted based on this analysis.

An exemplary interface including a jitter buffer system according to an embodiment of the present invention is shown in FIG. 2. A codec 14 includes an encoder 88 for encoding audio data and a decoder 96 for decoding incoming audio data. The decoder 86 is coupled to a digital-to-analog converter 82. Similarly, the encoder 88 is coupled to an analog-to-digital converter 84. A jitter buffer 113 is provided at the input to the decoder 86. A packetizer 80 is provided at the output of the encoder 88. The packetizer 80 formats outgoing audio data into data packets for transmission over the data network. A controller 110, which may be embodied as a known microcontroller, controls operation of the jitter buffer 113 and the packetizer 80. As will be explained in greater detail below, the controller 110, in conjunction with the jitter buffer cache 109, monitors jitter behavior and adjusts jitter buffer depth based on an analysis of current and past jitter. The jitter cache contains an exponentially averaged value representing specific destinations' statistical histories of jitter.

A dynamic jitter buffer control according to the present invention dynamically adjusts a jitter buffer depth in terms of a "current depth" and a "rise." Current depth is a parameter related to the measured size of the jitter buffer. Rise is the calculated "cushion" appended to the jitter buffer depth to account for a connection's previous history of jitter. Each time an increased level of jitter is sampled, a predetermined penalty is added to the rise, increasing the amount of "extra" buffer space provided. The rise penalty is a constant positive value which can only serve to increase the value of the rise. When the algorithm encounters a jitter rate higher than what the buffer provides for, a predetermined rise penalty is added to the current rise thereby increasing the overall depth of the jitter buffer. The increase in the overall rise of the jitter buffer prepares the buffer to handle an increase in jitter throughout a transmission. The rise variable allows the system to "learn" that a bad path might become bad again and more quickly adapt to it, while the current_depth adjusts to the current jitter characteristics. The delay will be minimized on good connections but the rise variable then allows the system to remain stable if the connection begins to encounter jitter again.

TABLE 1

| Parameter | Description |
| --- | --- |
| Current_depth | Current depth of the algorithm. The current_depth should not be confused with the overall depth of the jitter buffer. The overall depth of the jitter buffer includes both the current_depth and the rise. |
| rise | The "cushion" to increase the depth as a result of having a history of past jitter. This is a monotonically increasing variable. |

Parameters used include maximum and minimum thresholds, as well as rise increments, as described in Table 2 below:

TABLE 2

| Parameter | Description | Value Range |
| --- | --- | --- |
| Minimum_depth | This is the absolute lowest depth to which the jitter buffer may be adjusted. | Minimum buffering required for "optimal" network configuration. |
| Maximum_depth | This is the highest depth to which the jitter buffer may be adjusted. | Maximum buffering value compatible with acceptable regeneration of the original data. |
| Initial_depth | This is the initial value that will be assigned to current_depth before the first jitter sample is received if no information is available in the Jitter cache. | Tuned value based on mean network delivery time divided by the nominal packet rate. |
| Initial_rise | This is the initial value for the rise penalty cushion if no information is available in the Jitter cache. | Tuned value based on the standard deviation of the mean network packet delivery time (doubled) divided by the nominal packet rate. |
| Maximum_constant_rise | This is the maximum assessed rise penalty that can be administered to the jitter buffer depth. This value limits the amount of buffering "over" the current jitter-derived value applied. | Tuned value, to permit quickly adapting to degrading network conditions, while permitting acceptable performance for nominal network behavior. Generally, a bit less than the maximum depth less the initial depth. |
| Rise_penalty | A configurable constant which is added to the rise to account for jitter. The rise_penalty is used to increase the rise if deemed necessary by the algorithm and is the amount the cached rise is decremented initially for long-term decay | Tuned value providing for several increments of rise. |

As noted above, the jitter buffer depth is a combination of a current_depth and a rise value. These are used to allow the jitter buffer controller to adjust jitter buffer depth to meet the specific needs of each sequence.

The jitter buffer depth is initialized when a new sequence begins. During the initial jitter measurements, the jitter sample data is insufficient to derive a new jitter buffer depth customized to the current transmission. A certain number of jitter samples must be received before an accurate jitter buffer depth can be determined. The jitter cache prevents this lack of data from degrading jitter performance during this initial period.

To initialize the system for a particular transmission sequence using a particular path identification, the following operation is performed:

TABLE 2

| Maximum_constant_rise | This is the maximum assessed rise penalty that can be administered to the jitter buffer depth. This value limits the amount of buffering "over" the current jitter-derived value applied. | Tuned value, to permit quickly adapting to degrading network conditions, while permitting acceptable performance for nominal network behavior. Generally, a bit less than the maximum depth less the initial depth. |
| --- | --- | --- |
| Rise_penalty | A configurable constant which is added to the rise to account for jitter. The rise_penalty is used to increase the rise if deemed | Tuned value providing for several increments of rise. |

TABLE 2-continued necessary by the algorithm and
is the amount the cached rise is
decremented initially for long-
term decay As noted above, the jitter buffer depth is a combination of a current_depth and a rise value. These are used to allow the jitter buffer controller to adjust jitter buffer depth to meet the specific needs of each sequence.

The jitter buffer depth is initialized when a new sequence begins. During the initial jitter measurements, the jitter sample data is insufficient to derive a new jitter buffer depth customized to the current transmission. A certain number of jitter samples must be received before an accurate jitter buffer depth can be determined. The jitter cache prevents this lack of data from degrading jitter performance during this initial period.

To initialize the system for a particular transmission sequence using a particular path identification, the following operation is performed:

```
if the path identification is in the Jitter cache then
{
  current_depth = cached value (depth) + rise_penalty
  rise        = cached value (rise) - rise_penalty
}
else
{
  current_depth = initial_depth
  rise        = initial_rise
}
new_depth=minimum_depth
if new_depth >= maximum_depth then
{
  if current_depth = maximum_depth then
  {
    (Algorithm bound reached, the network is unreliable)
    Do not continue (No adjustment needed)
  }
  new_depth = maximum_depth
}
if new_depth + 1 > current_depth then
{
  new_rise = rise + rise_penalty
  if new_rise <= maximum_constant_rise then
    rise = new_rise
}
current_depth = new_depth + rise
PostSmoothingOption
Adjust jitter buffer depth to current_depth
if an adjustment has been made then
{
  new_cache_depth = (cache_alpha * prev_cache_depth)
        + ((1 - cache_alpha) * current_depth)
  new_cache_rise = (rise_alpha * prev_cache_rise)
        + ((1 - rise_alpha) * rise)
```

A variable, called new_depth, is calculated by taking the current sample value and dividing it by the frame duration. The frame duration represents the quantization division of the originally continuous data. A pre-smoothing operation also may be performed. Pre-smoothing is optional and is described in greater detail below. The variable new_depth is applied to the depth of the jitter buffer if it is deemed necessary by the controller. Once the possible new_depth has been determined, a series of comparisons are made to determine if an adjustment to the jitter buffer depth is required.

If the new_depth is less than the pre-configured minimum depth then the new depth is changed to the value of the minimum depth. If the new_depth is equal to the maximum_depth value, then it is determined if the current_depth equals the maximum_depth, and no adjustment is made. In this situation, a warning is issued stating that the jitter for this destination is very high. If, however, the new_depth has exceeded the acceptable maximum_depth value, then new_depth is set equal to the maximum_depth. This provides for improved accuracy in the jitter buffer depth, without exceeding the limits which would result in excessive delay.

If the computed $new_{13}$ depth plus one is greater than the current_depth, but does not meet any of the previous conditions, adjustments to both the rise and current_depth need to be made. A rise penalty is added to the current rise value. If the new_rise is less than or equal to the maximum_constant_rise, the rise is set to the new rise. As described above, the rise penalty is a monotonically increasing value that accounts for the variance of past jitter. This value also prevents the occurrence of sporadic or cyclic jitter from skewing the accuracy of the jitter buffer adjustment. Next, the current_depth is set to the new_depth plus rise. A post-smoothing operation may occur, as will be described in greater detail below. The cache depth is updated to the current depth.

Each time the current_depth or rise is changed, the jitter cache is updated to reflect the most recent states of these variables. That is, a new_cache depth and a $new\_cache_{13}$ rise are determined.

In particular, as noted above, the jitter cache contains exponentially averaged values representing a specific destination's history of depth and rise values. Each value is a combination of the current state of the variable being entered and a value representing the past states of the variable as a whole. A "sliding window exponential average" equation is used in the updating of both the depth and rise values in the cache. This allows the current rise and depth values to have a predetermined weight when used to update the jitter cache. The parameter Alpha determines the exponential behavior of this cache when new data is added. The Alpha value is indirectly proportional to the effect of the new values on the cache. Alpha may be between 0 and 1 inclusive. A large value of Alpha indicates that new updates have a small effect on the cache and vice versa.

As noted above, either (or both) the input data (new_depth) or the output data (current_depth) may be exponentially smoothed at the points indicated (PreSmoothing or PostSmoothing, or both). Smoothing may provide greater stability by changing the jitter buffer depth less frequently. However, smoothing generally makes the average jitter buffer depth somewhat higher, so the decision to smooth the data is application dependent.

PreSmoothing is computed as follows:

$$smoothed\_depth=depth\_alpha*smoothed\_depth+(1-depth\_alpha)*new\_depth$$

Then, the smoothed_depth value is used in place of the new_depth value. The depth_alpha value may vary from 0 to 1.

Postsmoothing is computed as follows:

$$jitter\_depth=jitter\_alpha*jitter\_depth+(1-jitter\_alpha)*current\_depth$$

The actual jitter buffer depth is then set to the computed jitter depth in place of the current_depth value. The jitter_alpha value may vary from 0 to 1.

What is claimed:

1. A method, comprising:

receiving data into a jitter buffer; and adjusting a depth of said jitter buffer by determining a parameter related to a measured size of the jitter buffer and increasing a size of the jitter buffer using a rise value, said rise value comprising a monotonically increasing value that accounts for the variance of past jitter.

2. A method according to claim 1, said adjusting comprising analyzing jitter of a current transmission.

3. A method, comprising:

receiving data into a jitter buffer; and adjusting a depth of said jitter buffer by analyzing a jitter history;

said adjusting comprising analyzing jitter of a current transmission and determining a current depth of said jitter buffer and a rise value, said rise value being a monotonically increasing variable and defining an amount by which said current depth may be increased, said rise and said current depth defining an overall jitter buffer depth.

4. A method according to claim 3, said adjusting comprising determining an initial current depth and rise from a jitter cache prior to reception of said current transmission.

5. A method according to claim 3, said adjusting comprising updating said jitter cache during said transmission.

6. A telecommunications system, comprising:

a packet network; and a jitter buffer system, said jitter buffer system including a jitter buffer, a jitter buffer cache, and a jitter buffer controller, said jitter buffer cache configured to store a history of network jitter, and said jitter buffer controller is configured to adjust a depth of said jitter buffer by analyzing said history and determining a parameter related to a measured size of the jitter buffer and increasing a size of the jitter buffer using a rise value, said rise value comprising a monotonically increasing value that accounts for the variance of past jitter.

7. A telecommunications system according to claim 6, said jitter buffer controller further configured to analyze jitter of a current transmission.

8. A telecommunications system, comprising:

a packet network; and a jitter buffer system, said jitter buffer system including a jitter buffer, a jitter buffer cache, and a jitter buffer controller, said jitter buffer cache configured to store a history of network jitter, and said jitter buffer controller is configured to adjust a depth of said jitter buffer by analyzing said history;

said jitter buffer controller configured to analyze jitter of a current transmission and determine a current depth of said jitter buffer and a rise value, said rise value being a monotonically increasing variable and defining an amount by which said current depth may be increased, said rise and said current depth defining an overall jitter buffer depth.

9. A telecommunications system according to claim 8, said jitter buffer controller configured to determine an initial current depth and rise from a jitter cache prior to reception of said current transmission.

10. A telecommunications system according to claim 9, said jitter buffer controller configured to update said jitter cache during said transmission.

11. A device, comprising:

a jitter buffer;

a jitter buffer cache configured to store a history of jitter of transmitted data; and a jitter buffer controller configured to adjust a depth of said jitter buffer by determining a parameter related to a measured size of the jitter buffer and increasing a size of the jitter buffer using a rise value, said rise value comprising a monotonically increasing value that accounts for the variance of past jitter.

12. A device according to claim 11, said jitter buffer controller further configured to analyze jitter of a current transmission.

13. A device, comprising:

a jitter buffer;

a jitter buffer cache configured to store a history of jitter of transmitted data; and a jitter buffer controller configured to adjust a depth of said jitter buffer by analyzing said history;

said jitter buffer controller configured to analyze jitter of a current transmission and determine a current depth of said jitter buffer and a rise value, said rise value being a monotonically increasing variable and defining an amount by which said current depth may be increased, said rise and said current depth defining an overall jitter buffer depth.

14. A device according to claim 13, said jitter buffer controller configured to determine an initial current depth and rise from a jitter cache prior to reception of said current transmission.

15. A device according to claim 14, said jitter buffer controller configured to update said jitter cache during said transmission.

16. A method, comprising:

receiving data into a jitter buffer;

determining a depth value of said jitter buffer; and adjusting said depth value by performing an exponential smoothing on said depth value.

* * * * *